United States Patent
Chan

(10) Patent No.: US 7,983,511 B1
(45) Date of Patent: Jul. 19, 2011

(54) METHODS AND APPARATUS FOR NOISE REDUCTION IN DIGITAL IMAGES

(75) Inventor: Eric Chan, Belmont, MA (US)

(73) Assignee: Adobe Systems Incorporated, San Jose, CA (US)

( * ) Notice: Subject to any disclaimer, the term of this patent is extended or adjusted under 35 U.S.C. 154(b) by 0 days.

(21) Appl. No.: 12/955,438

(22) Filed: Nov. 29, 2010

(51) Int. Cl.
*G06K 9/40* (2006.01)

(52) U.S. Cl. .......................... 382/275; 382/266

(58) Field of Classification Search .................. 382/254, 382/275, 266, 260, 261
See application file for complete search history.

(56) References Cited

U.S. PATENT DOCUMENTS

| | | |
|---|---|---|
| 7,257,271 B2 | 8/2007 | Adams, Jr. et al. |
| 2008/0095431 A1 | 4/2008 | Ishiga |
| 2009/0052775 A1 | 2/2009 | Moon et al. |
| 2009/0285480 A1 | 11/2009 | Bennett et al. |
| 2010/0189374 A1 | 7/2010 | Tsukioka |

*Primary Examiner* — John Strege
*Assistant Examiner* — Claire Wang
(74) *Attorney, Agent, or Firm* — Robert C. Kowert; Meyertons, Hood, Kivlin, Kowert & Goetzel, P.C.

(57) ABSTRACT

Methods and apparatus for reducing or removing noise in digital images. Image noise reduction methods are described that may be applied to grayscale and color images, for example RGB images. An image noise reduction method may, before applying a noise filtering technique, transform the image values from linear space to flat noise space in which the noise is independent of the signal. An edge-preserving noise filtering technique may then be applied to the image in flat noise space. After noise filtering is applied, the image is transformed from flat noise space back to linear space. For color images, the flat noise space may be converted from linear color space to luminance-chrominance space before applying the noise filtering technique so that different filters can be applied to luminance and color channels. After applying the noise filtering technique, the image is converted back to linear color space.

20 Claims, 8 Drawing Sheets

METHODS AND APPARATUS FOR NOISE REDUCTION IN DIGITAL IMAGES

BACKGROUND

Description of the Related Art

Digital images, for example images captured with digital cameras or digitized from negatives, slides, or pictures, tend to include noise. Noise may be introduced into a digital image by one or more sources. A camera sensor, lens, or other component may introduce noise into an image. In addition, photon (shot) noise may be present even if the camera sensor itself is free of noise. Noise may be expressed in a digital image as speckles, blotches, or other artifacts.

Conventional noise filtering methods exist that may remove or reduce noise in digital images. However, noise tends to be signal-dependent (e.g., brighter pixel values tend to have more noise than darker pixels). This may pose difficulties for conventional noise filtering methods, as the methods may have to determine the brightness at each pixel to determine how much noise reduction to apply at the pixel. Furthermore, many conventional noise filtering methods tend to either blur over edges, or in trying to preserve edges fail to smooth the image sufficiently in non-detail areas.

SUMMARY

Various embodiments of methods and apparatus for reducing or removing noise in digital images are described. Image noise reduction methods are described that may be applied to grayscale (one channel) and color (N-channel) images, for example RGB color (three channel) images. It can be shown that noise is signal-dependent (e.g., brighter pixel values tend to have more noise). Thus, to simplify the image noise reduction process, embodiments of the image noise reduction methods may, before applying a noise filtering technique to reduce or remove noise in the image, transform the image values from linear space to flat or uniform noise space in which the noise is independent of the image values (i.e., independent of the signal). An edge-preserving noise filtering technique may then be applied to the image in flat noise space. After noise filtering is applied, the image is transformed from flat noise space back to linear space.

The general method for reducing noise as described above may be applied to one-channel images. However, embodiments of the image noise reduction methods may also be applied to N-channel (e.g., three-channel RGB) images. In at least some embodiments of the method, for RGB images, after the image values are transformed from linear space to flat noise space, the RGB image may be transformed to a luminance-chrominance representation, for example to a YCC color space. The RGB image values are transformed to YCC values (i.e., a luminance channel and two color or chrominance channels, e.g. a red difference chrominance component and a blue difference chrominance component). Noise filters may then be applied to the Y, $C_1$, and $C_2$ channels of the YCC image to remove or reduce noise in the channels. In at least some embodiments, the filtering method applied to the Y (luminance) channel may be different than the filtering method applied to the $C_1$ and $C_2$ (color) channels. The YCC values may then be transformed back to RGB values. The image is then transformed from flat noise space back to linear space. Transforming the RGB image to a luminance-chrominance space before noise filtering is applied allows different noise filtering methods to be used for luminance and color to accommodate the different spatial frequency responses of the human eye to luminance and color signals.

Two color noise reduction methods are presented that may be used in embodiments. The first method, which may be referred to as higher-quality color noise reduction method, produces higher-quality results but is more expensive to compute. This first method applies a two-dimensional kernel as the noise reduction filter to both color channels. The two-dimensional kernel includes a weighting function that takes all three channels into consideration to minimize color "bleeding" at luminance and color boundaries in the image. The second method, which may be referred to as fast color noise reduction method, is much faster to compute, but may blur some fine color details. This second method first forms a 2-level image pyramid comprising a high-pass image and a lower-resolution, low-pass image. The two-dimensional kernel is applied to the color channels in the low-pass image. For the high-pass image, for each color channel, a rank filter is applied, followed by an adaptive threshold. The images are then combined to obtain noise-reduced image values for the color channels.

Two luminance noise reduction methods are presented that may be used in embodiments. The first method, which may be referred to as higher-quality luminance noise reduction method, produces higher-quality results but is more expensive to compute. The second method, which may be referred to as fast luminance noise reduction method, is much faster to compute, but may not produce quite as high quality results. Both of these methods identify detail pixels in the luminance channel and apply a one-dimensional filter to the detail pixels; a similar filter, but two-dimensional, is applied to the non-detail pixels. The detail pixels tend to represent edges; the one-dimensional filter is applied at each detail pixel in the direction perpendicular to the local image gradient at the pixel. Thus, the filtering for detail pixels is done along edges, not across edges, which helps to preserve edges and to reduce blurring across edges. In the first, method, the one- and two-dimensional filters are both applied to the full-resolution image. In the second method, a P-dimensional image pyramid is first formed that contains a lowest-resolution image as a low-pass image and one or more higher-resolution images. The two-dimensional filter is applied only to the low-pass image; the one-dimensional filter is applied to all of the higher-resolution images. The images are then combined to obtain noise-reduced image values for the luminance channel.

While these luminance channel filtering methods are described in relation to removing noise from the luminance channel of a three-channel luminance-chrominance image, these methods may also be applied to the single channel in one-channel (grayscale) images to remove or reduce noise in the images.

Figure 1:
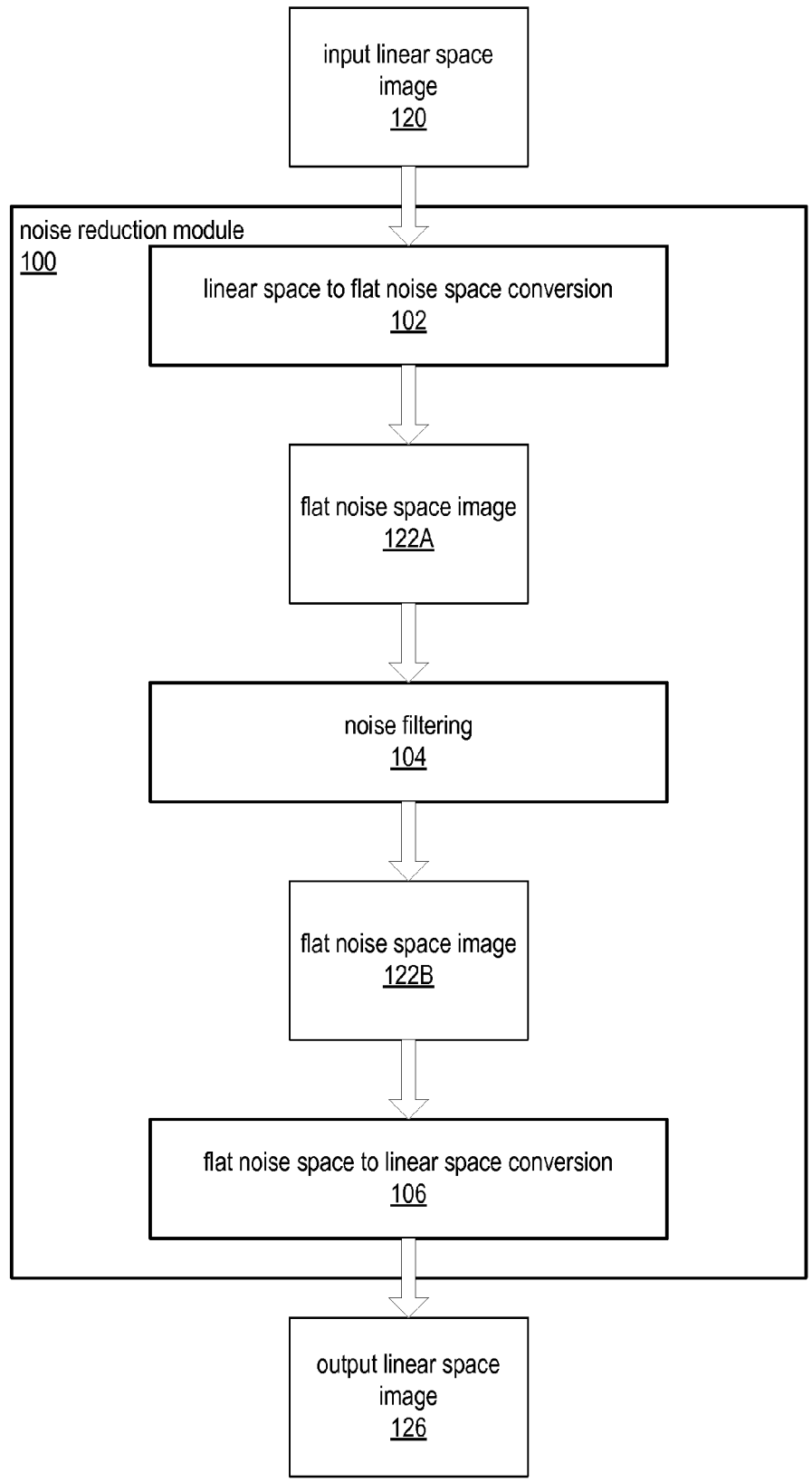
FIG. 1 is a block diagram illustrating data flow and processing in a noise reduction module that implements an image noise reduction method according to at least some embodiments.

While the invention is described herein by way of example for several embodiments and illustrative drawings, those skilled in the art will recognize that the invention is not limited to the embodiments or drawings described. It should be understood, that the drawings and detailed description thereto are not intended to limit the invention to the particular form disclosed, but on the contrary, the intention is to cover all modifications, equivalents and alternatives falling within the spirit and scope of the present invention. The headings used herein are for organizational purposes only and are not meant to be used to limit the scope of the description. As used throughout this application, the word "may" is used in a permissive sense (i.e., meaning having the potential to), rather than the mandatory sense (i.e., meaning must). Similarly, the words "include", "including", and "includes" mean including, but not limited to.

DETAILED DESCRIPTION OF EMBODIMENTS

In the following detailed description, numerous specific details are set forth to provide a thorough understanding of claimed subject matter. However, it will be understood by those skilled in the art that claimed subject matter may be practiced without these specific details. In other instances, methods, apparatuses or systems that would be known by one of ordinary skill have not been described in detail so as not to obscure claimed subject matter.

Some portions of the detailed description which follow are presented in terms of algorithms or symbolic representations of operations on binary digital signals stored within a memory of a specific apparatus or special purpose computing device or platform. In the context of this particular specification, the term specific apparatus or the like includes a general purpose computer once it is programmed to perform particular functions pursuant to instructions from program software. Algorithmic descriptions or symbolic representations are examples of techniques used by those of ordinary skill in the signal processing or related arts to convey the substance of their work to others skilled in the art. An algorithm is here, and is generally, considered to be a self-consistent sequence of operations or similar signal processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals or the like. It should be understood, however, that all of these or similar terms are to be associated with appropriate physical quantities and are merely convenient labels. Unless specifically stated otherwise, as apparent from the following discussion, it is appreciated that throughout this specification discussions utilizing terms such as "processing," "computing," "calculating," "determining" or the like refer to actions or processes of a specific apparatus, such as a special purpose computer or a similar special purpose electronic computing device. In the context of this specification, therefore, a special purpose computer or a similar special purpose electronic computing device is capable of manipulating or transforming signals, typically represented as physical electronic or magnetic quantities within memories, registers, or other information storage devices, transmission devices, or display devices of the special purpose computer or similar special purpose electronic computing device.

Various embodiments of methods and apparatus for reducing or removing noise in digital images are described. The image noise reduction methods may be applied to digitally captured raw image data, but may also be applied to reduce or remove noise in other types of digital images than raw images. Image noise reduction methods are described that may be applied to grayscale (one channel) and color (N-channel) images, for example RGB color (three channel) images. While embodiments of the image noise reduction methods are generally described as being applied to three-channel (e.g., RGB) images, embodiments may be adapted for application to other types of N-channel images than RGB images. The images may be digital images captured with digital cameras, or may be images digitized from, for example, photographs, paintings, film negatives, or slides, using digitizing scanner technology. In addition, embodiments may be applied to remove noise from digital video frames.

Figure 7:
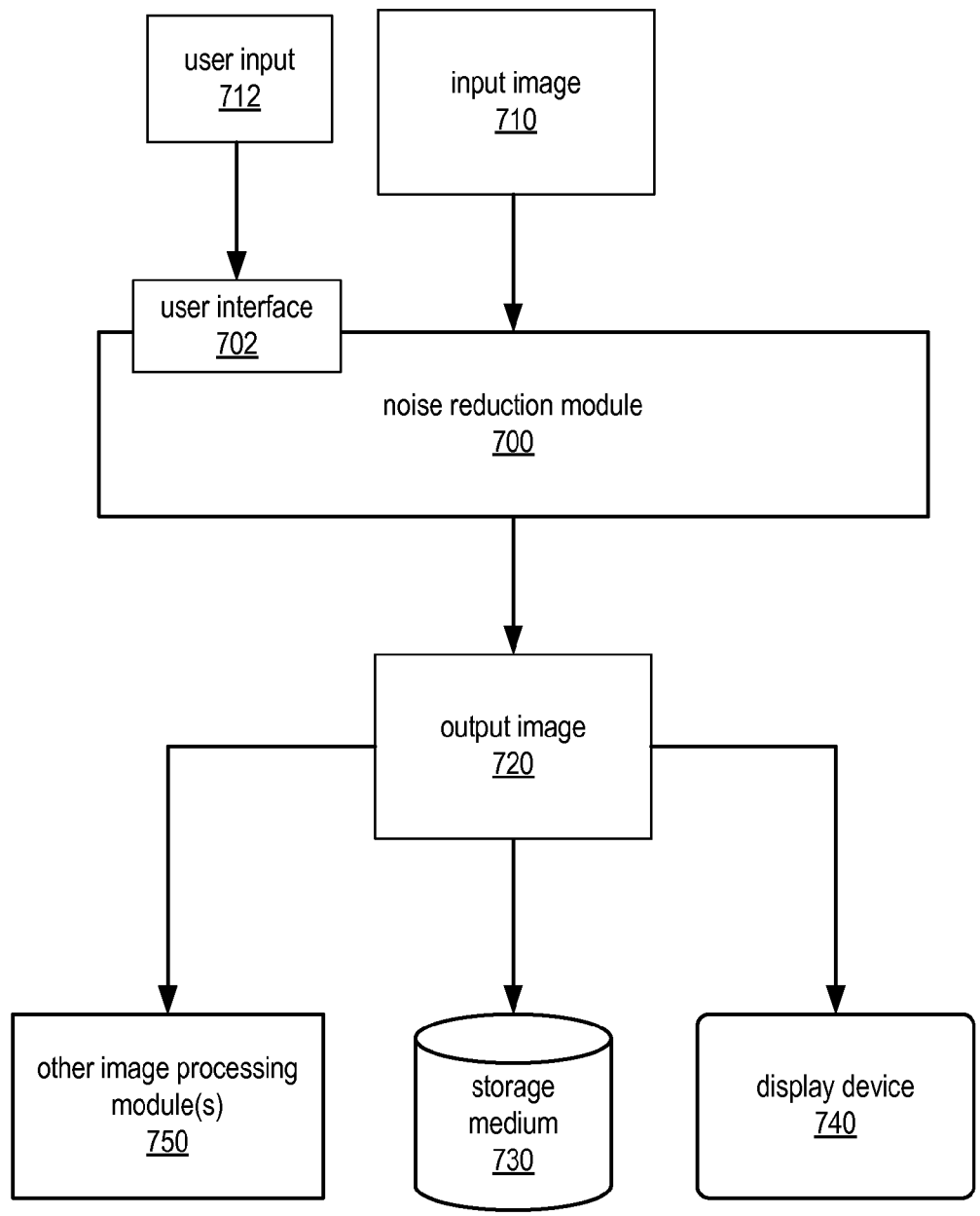
FIG. 7 illustrates an example noise reduction module that may implement one or more of the noise reduction techniques illustrated in FIGS. 1 through 6.
Figure 8:
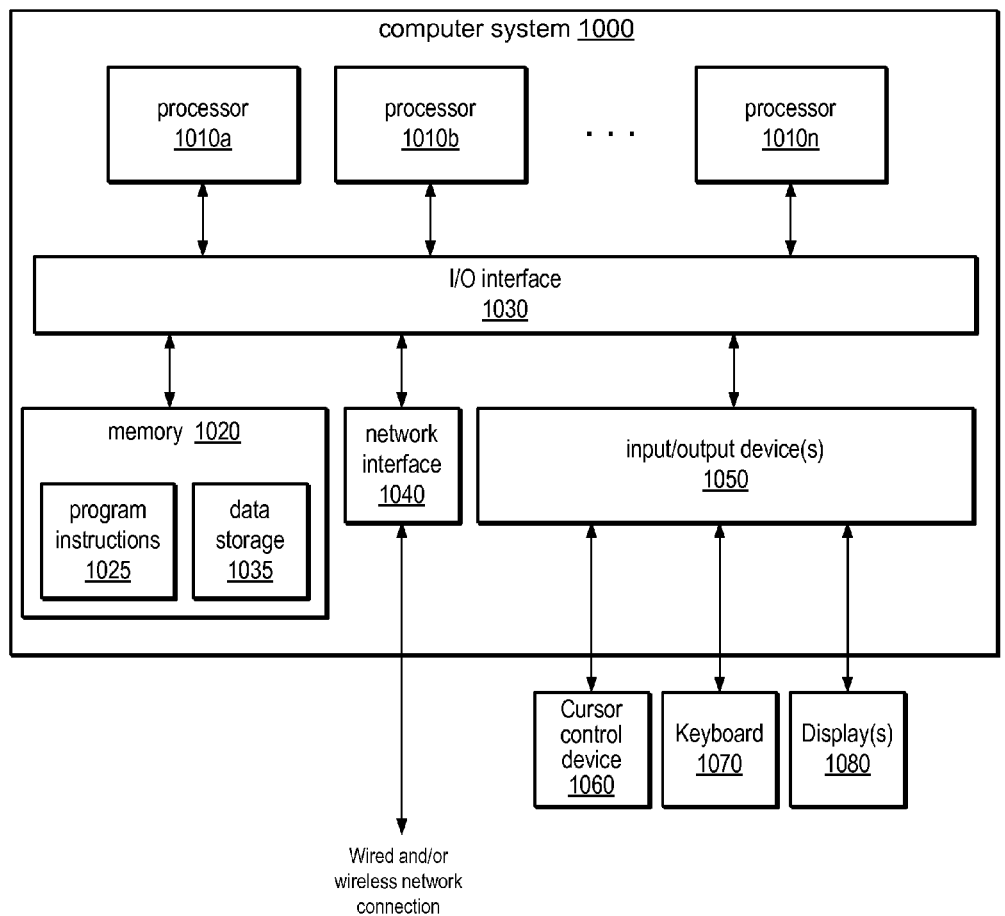
FIG. 8 illustrates an example computer system on which embodiments of a noise reduction module may be implemented.

Embodiments of the image noise reduction methods as described herein may be implemented in software, hardware, or a combination thereof. For example, embodiments of the image noise reduction methods may be performed by a noise reduction module implemented by program instructions stored in a computer-readable storage medium and executable by one or more processors (e.g., one or more CPUs and/or one or more GPUs). Embodiments of a noise reduction module may, for example, be implemented as a stand-alone application, as a module of an application, as a plug-in for applications including image processing applications, and/or as a library function or functions that may be called by other applications such as image processing applications. Embodiments of the noise reduction module may be implemented in any image processing application, or more generally in any application in which noise may be reduced or removed in images. Example applications in which embodiments may be implemented may include, but are not limited to, Adobe® Photoshop®, Adobe® Camera Raw®, and Adobe® Lightroom®. "Adobe", "Photoshop", "Camera Raw", and "Lightroom" are either registered trademarks or trademarks of Adobe Systems Incorporated in the United States and/or other countries. An example noise reduction module that may implement the image noise reduction methods as described herein is illustrated in FIG. 7. An example computer system on which a noise reduction module may be implemented is illustrated in FIG. 8.

Figure 9:
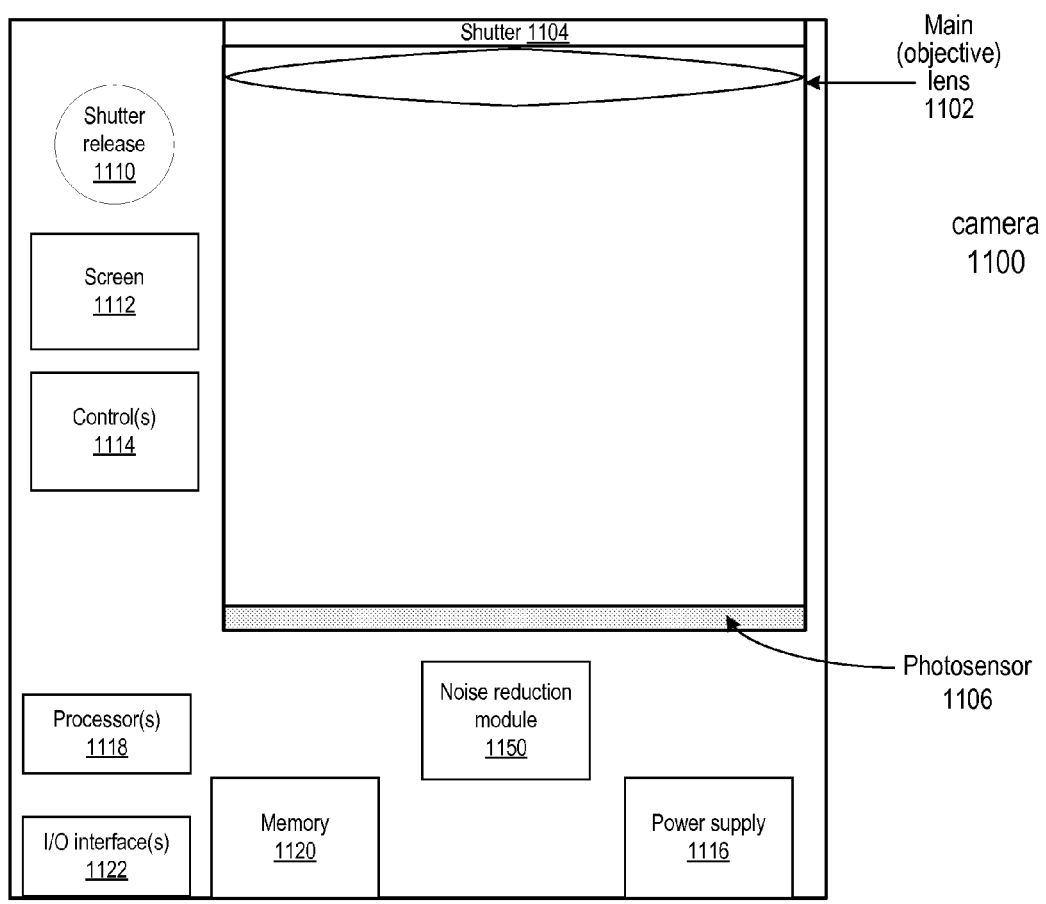
FIG. 9 illustrates an example camera in which embodiments of a noise reduction module may be implemented.

In addition to computer system implementations, embodiments of the image noise reduction methods as described herein may be implemented in other devices, for example in digital cameras for noise reduction in captured images, as a software module, hardware module, or a combination thereof. An example camera in which a noise reduction module may be implemented is illustrated in FIG. 9.

In both one-channel and N-channel cases, the image may be assumed to be in a linear light space, with each pixel value in a nominal [0.0, 1.0] range. Consider an image of a uniform surface of constant color. Without noise, all pixels in the image would have the same value (e.g., 0.5). With noise, there is some variation in the image values (e.g., some values below 0.5, and some above 0.5). Noise may be defined herein as the standard deviation of the image values.

It can be shown that noise is signal-dependent (e.g., brighter pixel values tend to have more noise). This may pose difficulties for conventional noise filtering methods, as the methods may have to determine the brightness at each pixel to determine how much noise reduction to apply at the pixel. Thus, to simplify the image noise reduction methods, embodiments of the image noise reduction methods may, before applying a noise filtering technique to reduce or remove noise in the image, transform the image values from linear space to flat or uniform noise space in which the noise is independent of the image values (i.e., independent of the signal). The noise filtering technique may then be applied to the image in flat noise space. Embodiments may employ one or more edge-preserving noise filtering techniques as described herein. After noise filtering is applied, the image is transformed from flat noise space back to linear space.

FIG. 1 is a block diagram illustrating data flow and processing in a noise reduction module that implements an image noise reduction method according to at least some embodiments. The module 100 may obtain, as input, a linear space image 120, for example a one-channel grayscale image or a three-channel RGB image, in which noise is to be reduced or removed. The image 120 may be, but is not necessarily, in raw image format. A camera raw image file contains minimally processed ("raw") data captured with an image sensor of a device, e.g. a camera or scanner. Linear space to flat noise space conversion 102 may be applied to convert the input linear space image 120 into a flat noise space image 122A. Noise filtering 104 is then applied to the flat noise space image 122A to generate flat noise space image 122B with the image noise reduced or removed. In at least some embodiments, an edge-preserving filtering method may be applied to the image to perform the noise filtering 104. Flat noise space to linear space conversion 106 may then be applied to convert the flat noise space image 122B to an output linear space image 126 with image noise reduced or removed.

The general method for reducing noise as described above may be applied to one-channel images. However, as mentioned above, embodiments of the image noise reduction methods may also be applied to N-channel (e.g., three-channel RGB) images. In at least some embodiments of the method, for RGB images, after the image values are transformed from linear space to flat noise space, the RGB image may be transformed to a luminance-chrominance representation, for example to a YCC color space (also referred to as $YC_BC_R$ color space or $YC_1C_2$ color space). The RGB image values are transformed to YCC values (i.e., a luminance channel and two color or chrominance channels, e.g. a red difference chrominance component and a blue difference chrominance component). Noise filters may then be applied to the Y, $C_1$, and $C_2$ channels of the YCC image to remove or reduce noise in the channels. In at least some embodiments, the filtering method applied to the Y (luminance) channel may be different than the filtering method applied to the $C_1$ and $C_2$ (color) channels. The YCC values may then be transformed back to RGB values. The image is then transformed from flat noise space back to linear space. Transforming the RGB image to a luminance-chrominance space before noise filtering is applied allows different noise filtering methods to be used for luminance and color to accommodate the different spatial frequency responses of the human eye to luminance and color signals.

While embodiments are described that transform RGB images into YCC images before applying the noise reduction filters, and then transform the YCC images back to RGB images, other luminance-chrominance spaces may be used than YCC. For example, the Lab color space may be used in some embodiments instead of the YCC color space, and thus an RGB-to-Lab transform (and reciprocal Lab-to-RGB transform) may be performed in these embodiments. However, using a different color space than YCC may require some adjustments to at least some of the algorithms described herein.

Figure 2:
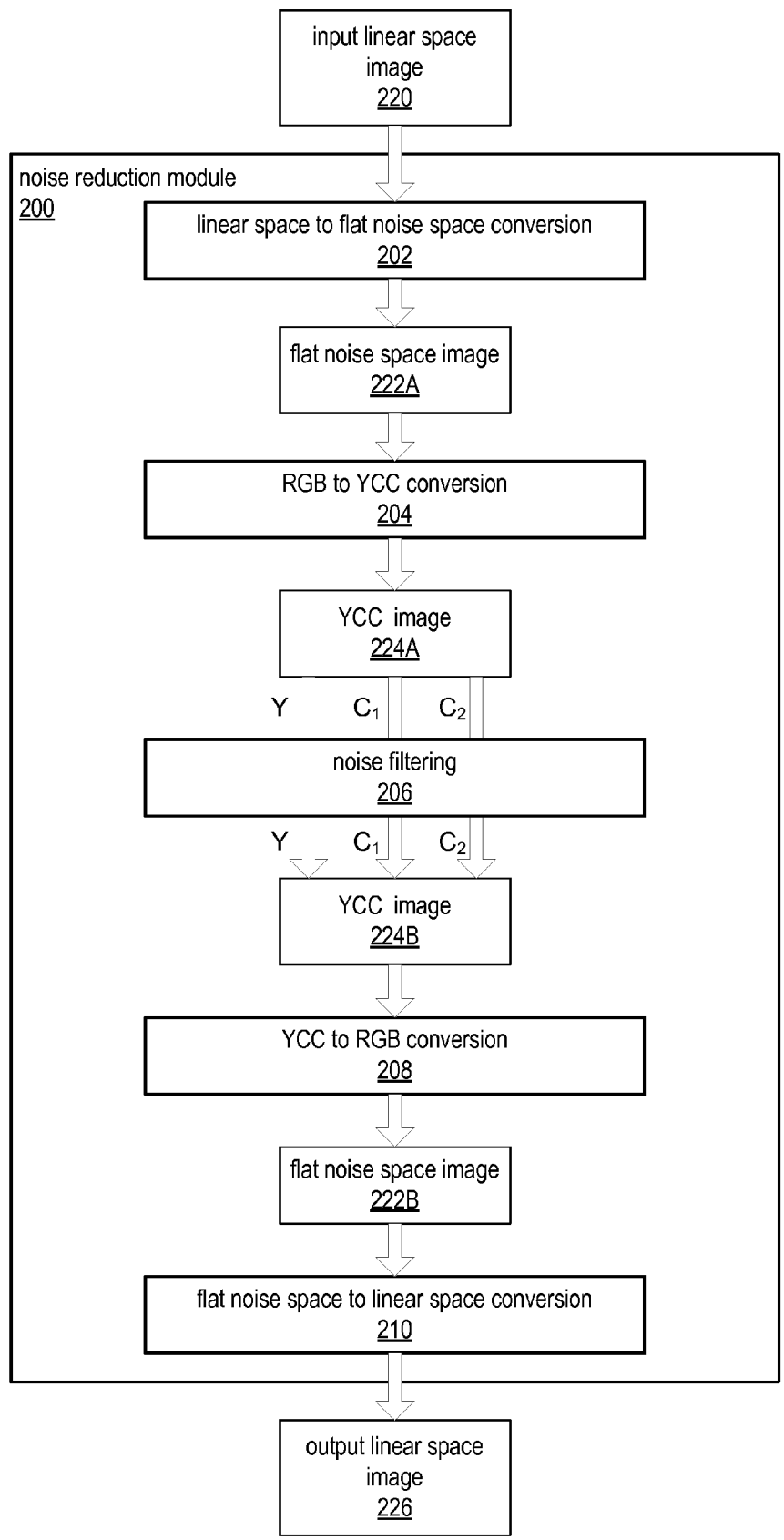
FIG. 2 is a block diagram illustrating data flow and processing in a noise reduction module that implements an image noise reduction method as applied to an RGB image according to at least some embodiments.

FIG. 2 is a block diagram illustrating data flow and processing in a noise reduction module that implements an image noise reduction method as applied to an RGB image according to at least some embodiments. The module 200 may obtain, as input, a linear space image 220, for example an RGB image, from which noise is to be removed. The image 220 may be, but is not necessarily, in raw image format. Linear space to flat noise space conversion 202 may be applied to convert the input linear space image 220 into a flat noise space image 222A. RGB to YCC conversion 204 may then be applied to convert flat noise space image 222A to YCC image 224A. Noise filtering 206 is then applied to the YCC image 224A to generate YCC image 224B with the image noise reduced or removed. In at least some embodiments, an edge-preserving filtering method may be applied that performs the noise filtering 206 separately on each channel (Y (luminance), and $C_1$ and $C_2$ (color)). YCC to RGB conversion 208 may then be applied to convert YCC image 224B to flat noise space image 222B. Flat noise space to linear space conversion 210 may then be applied to convert the flat noise space image 222B to an output linear space image 226 with the image noise reduced or removed.

Figure 3:
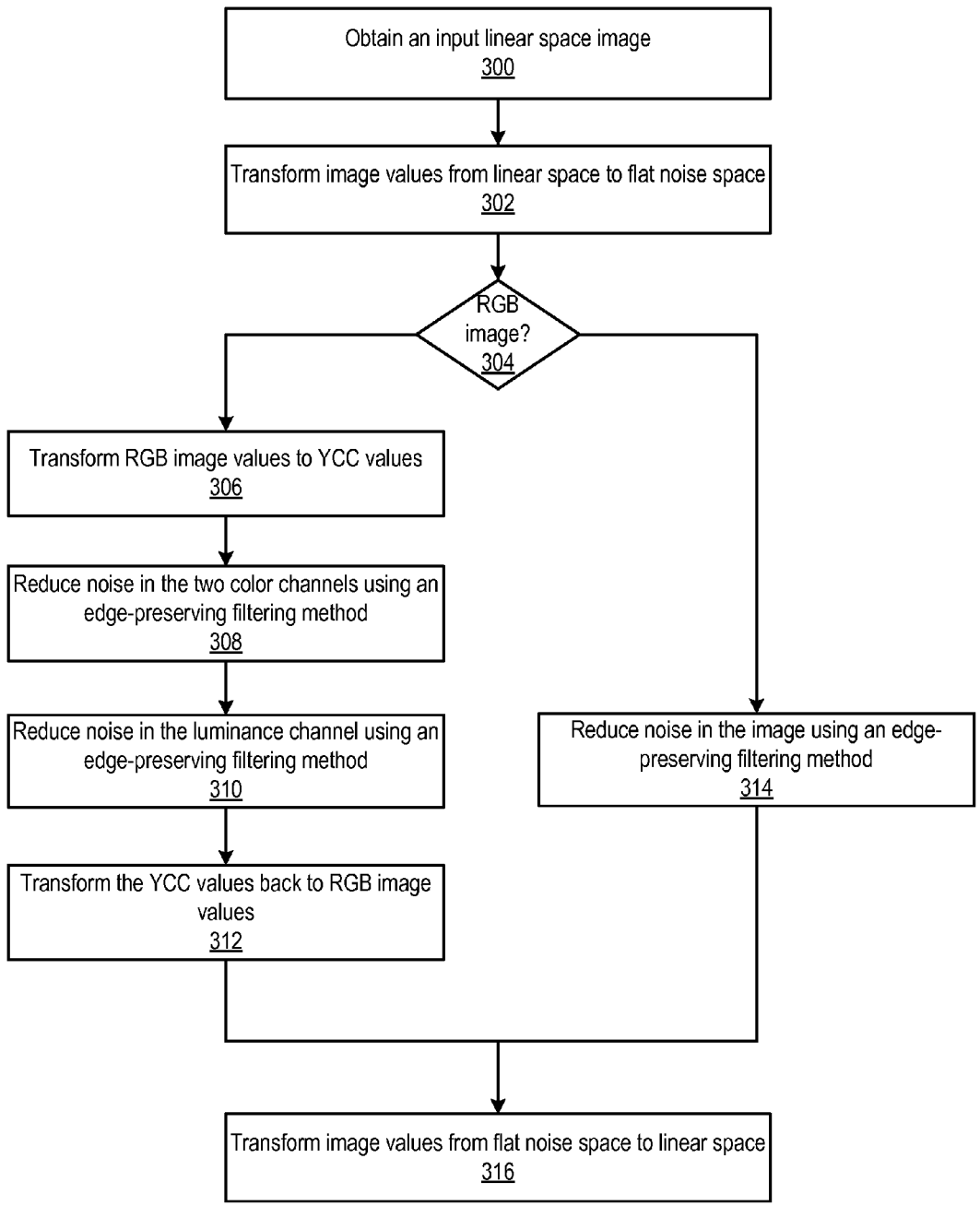
FIG. 3 is a flowchart of a method for reducing noise in images, according to at least some embodiments.

FIG. 3 is a flowchart of a method for reducing noise in images, according to at least some embodiments. As indicated at 300, an input (linear space) image may be obtained, for example a one-channel grayscale image or an RGB image. As indicated at 302, the image values may be transformed from linear space to flat noise space. At 304, if the image is an RGB image, then the RGB image values may be transformed to YCC values (a luminance channel Y and two color channels, $C_1$ and $C_2$) as indicated at 306. As indicated at 308, an edge-preserving filtering method may be applied to the two color channels to reduce noise in the channels. As indicated at 310, an edge-preserving filtering method may be applied to the luminance channel to reduce noise in the luminance channel. As indicated at 312, the YCC values may then be transformed back to RGB image values. As indicated at 316, the image values may then be transformed from flat noise space back to linear space.

At 304, if the image is a one-channel (grayscale) image, then an edge-preserving filtering method may be applied to the image to reduce noise from the image, as indicated at 314. In at least some embodiments, this method may be the same as or similar to the method used at 310 to reduce noise in the luminance channel of a YCC image. As indicated at 316, the image values may then be transformed from flat noise space back to linear space.

The various elements of the image noise reduction methods as illustrated in FIGS. 1 through 3 are described in more detail in the following sections.

Linear Space to Flat Noise Space Conversion

Noise may be expressed in a digital image as speckles, blotches, or other artifacts. Noise in a digital image may include noise introduced by a camera component such as the camera sensor, lens, or some other component. In addition, photon (shot) noise may be present in an image, even if the camera sensor itself is free of noise. The noise function N(z) may be defined as the standard deviation of the mean image value z. For a digital camera system, noise may be modeled as:

$$N(z) = \sqrt{A \cdot z + B} \quad (1)$$

where z is the mean image value in the nominal range [0.0, 1.0]. A and B are noise parameters that may depend on the camera and the image capture settings of the camera (e.g., camera sensor, ISO settings, etc.); higher values correspond to more noise in the image; lower values correspond to less noise in the image. A is proportional to the photon (shot) noise that exists even if the camera sensor itself is free of noise. B is the camera system noise that exists even when no light is present.

The equation above implies that noise is signal-dependent (e.g., brighter pixel values have more noise than darker pixels). This may pose difficulties for conventional noise filtering methods, as the methods may have to determine the brightness at each pixel to determine how much noise reduction to apply at the pixel. Thus, to simplify the image noise reduction methods, embodiments may transform the image values from linear space to a flat noise space in which the noise is independent of the image values (the signal). In at least some embodiments, this may be done using the following transformation:

$$f(x) = \frac{\sqrt{A \cdot x + B} - \sqrt{B}}{\sqrt{A + B} - \sqrt{B}} \quad (2)$$

where x is the input image value in linear space in the range [0.0, 1.0], and f(x) is the output image value in flat noise space, also in the range [0.0, 1.0]. In this flat noise space, the noise is independent of the signal and has approximately the following value:

$$k_N = \frac{A}{2(\sqrt{A+B} - \sqrt{B})} \quad (3)$$

For one-channel (e.g., grayscale) images, the transformation is performed on the single channel. For N-channel images (e.g., RGB images), the transformation is performed on each channel separately.

Obtaining A and B

As noted above, A and B are noise parameters that may depend on the camera and the image capture settings of the camera. As such, the values of A and B may be predetermined via a measurement process applied to the camera or to calibration images captured using the camera. The values may be determined at multiple different settings of the camera, and for multiple different cameras. In some embodiments, different values for A and B may be stored in a table, and accessed by the image noise reduction method according to the characteristics of the camera used to capture a given input image to which the image noise reduction method is to be applied. Alternatively, values for A and B may be empirically determined. For example, a user interface may be provided that includes one or more user interface elements (e.g., slider bars) via which the user can dynamically adjust the values of A and/or B and view the results; the user can view the output image to determine if the current values of A and/or B produce desired results, and may adjust the values accordingly to obtain different results if desired. The user interface may also allow the user to store empirically determined values of A and B for application to other images.

RGB to YCC Conversion

For RGB images, the next step is to transform the RGB image to luminance-chrominance space (e.g., to a YCC image with one luminance channel Y and two color channels, $C_1$ and $C_2$). This is advantageous for noise reduction, because it allows separate methods to be used for luminance and color to accommodate the different spatial frequency responses of the human eye to luminance and color signals.

In at least some embodiments, the RGB to YCC transformation may be performed using a 3×3 matrix M:

$$\begin{pmatrix} Y \\ C_1 \\ C_2 \end{pmatrix} = M \cdot \begin{pmatrix} R \\ G \\ B \end{pmatrix} \quad (4)$$

where M may be created as follows. First, non-negative constants $k_r$, $k_g$, and $k_b$ are selected such that $k_r + k_g + k_b = 1$. Next, the following may be computed:

$$k_{rS} = 0.5 / (k_r - 1),$$

$$k_{bS} = 0.5 / (k_b - 1).$$

Finally, matrix M may be constructed as follows:

$$M = \begin{pmatrix} k_r & k_g & k_b \\ (k_r - 1)k_{rS} & k_g k_{rS} & k_b k_{rS} \\ k_r k_{bS} & k_g k_{bS} & (k_b - 1)k_{bS} \end{pmatrix} \quad (5)$$

In at least some embodiments, the output luminance Y value will be in the nominal range [0.0, 1.0], and the output color $C_1$ and $C_2$ values will be in the nominal range [−0.5, 0.5].

For example, if $k_r = 0.25$, $k_b = 0.25$ and $k_g = 0.5$, then M is:

$$M = \begin{pmatrix} \frac{1}{4} & \frac{1}{2} & \frac{1}{4} \\ \frac{1}{2} & -\frac{1}{3} & -\frac{1}{6} \\ -\frac{1}{6} & -\frac{1}{3} & \frac{1}{2} \end{pmatrix}$$

Noise Reduction

After the image is transformed to YCC color space, noise reduction filters may be applied to the luminance channel (Y) and color channels ($C_1$ and $C_2$). In embodiments, an edge-preserving noise filtering technique may be applied to the image in which each channel is filtered separately. However, when filtering the color channels ($C_1$ and $C_2$), all three channels are taken into consideration when determining how much noise reduction to apply via a weighting function W, described below. When filtering the luminance channel (Y), only values in the Y channel are taken into consideration.

Reducing Color Noise

The following describes methods for removing or reducing color noise (manifested as color speckles, blotches, etc.) from the $C_1$ and $C_2$ color channels of the YCC image, while preserving fine color details. Two color noise reduction methods are presented that may be used in embodiments. The first method, which may be referred to as higher-quality color noise reduction method, produces higher-quality results but is more expensive to compute. The second method, which may be referred to as fast color noise reduction method, is much faster to compute, but may blur some fine color details. In at least some embodiments, the first method may be used for final frame, higher-quality rendering, while the second method may be used for interactive or preview rendering where higher-speed performance is needed. In at least some embodiments, higher-quality noise reduction and faster noise reduction may be provided as options to the user via a user interface to a noise reduction module.

Higher-Quality Color Noise Reduction Method

The color channels $C_1$ and $C_2$ of the YCC image may be filtered using the following two-dimensional kernel as the noise reduction filter:

$$C'_1(x_0,y_0) = \int_{x,y \in \Omega} C_1(x,y) \cdot W(x_0,y_0,x,y) dx\, dy$$

$$C'_2(x_0,y_0) = \int_{x,y \in \Omega} C_2(x,y) \cdot W(x_0,y_0,x,y) dx\, dy \quad (6)$$

where $\Omega$ is a neighborhood centered at the current pixel (e.g., a 5×5, 7×7, or 9×9 neighborhood), $(x_0, y_0)$ is the center pixel in the neighborhood, and W is a weighting function, for example as defined below in equation (7). Effectively, for each pixel in each color channel, a weighted average is taken of all pixels in the neighborhood $\Omega$, and the pixel value is replaced with the weighted average. In at least some embodiments, the following weighting function may be used:

$$W(x_0, y_0, x, y) = \quad (7)$$
$$\exp\left\{-\left(\frac{Y(x_0, y_0) - Y(x, y)}{k_Y}\right)^2 - \left(\frac{C_1(x_0, y_0) - C_1(x, y)}{k_{C_1}}\right)^2 - \left(\frac{C_2(x_0, y_0) - C_2(x, y)}{k_{C_2}}\right)^2\right\}$$

Note that this weighting function takes all three channels into consideration. In equation (7), $k_Y$, $k_{C_1}$, and $k_{C_2}$ are noise reduction parameters. In at least some embodiments, these parameters may be set to positive multiples of the flat noise value $k_N$ (see equation (3)). In at least some embodiments, the level of difference that the pixel values can be before the weight gets small can be controlled by adjusting $k_Y$, $k_{C_1}$, and $k_{C_2}$. For example, for a noisy image, the difference between neighboring pixels may be large, and therefore $k_Y$, $k_{C_1}$, and $k_{C_2}$ may be adjusted accordingly to allow pixel values to be more different, which allows the weight values to be higher, and thus for more smoothing to be performed. For an image with a low amount of noise, $k_Y$, $k_{C_1}$, and $k_{C_2}$ may be adjusted in the other direction so that neighboring pixel values are not allowed to differ very much from the center pixel value to encourage the weight values to be smaller.

The weighting function W, which takes both luminance differences and color differences in both color channels into consideration, minimizes color "bleeding" at luminance and color boundaries in the image. Therefore, color noise is removed while preserving edges.

For each pixel in each color channel, this filtering method compares pixel values in a neighborhood $\Omega$ to the center pixel value of the neighborhood at $(x_0, y_0)$. The weighting function W is based on how much the pixel values differ. If a neighboring pixel is relatively different than the center pixel, the neighboring pixel is given a corresponding smaller weight. If the two pixels are relatively similar, the neighboring pixel is given a correspondingly higher weight. Thus, when taking the weighted average, neighboring pixels that are more similar to the center pixel get higher weights, while neighboring pixels that are less similar to the center pixel get lower weights. Considering all three components (luminance and both color channels) in the weighting function W helps preserve edges. If, at a pixel, there is a large difference in brightness, this will show up in the luminance channel; color differences show up in the color channels. If there is an edge at the pixel, the edge will show up in at least one of the channels. This helps in preserving edges and limits blurring across edges.

The kernel window $\Omega$ may be set small (e.g., 2-pixel radius) when the noise level in the image is low, or when faster performance is desired. Conversely, the kernel window $\Omega$ may be set large (e.g., 20-pixel radius) when the noise level in the image is high and performance is not an issue. Larger kernels are generally more successful in removing low-frequency color noise (manifesting as "splotches" or "blobs") than smaller kernels, but require more processing time, and may also result in overall loss of contrast.

Note that the filters shown in equation (6) may be applied sequentially to the two color channels or, alternatively, may be applied concurrently to the two color channels.

Fast Color Noise Reduction Method

Figure 4:
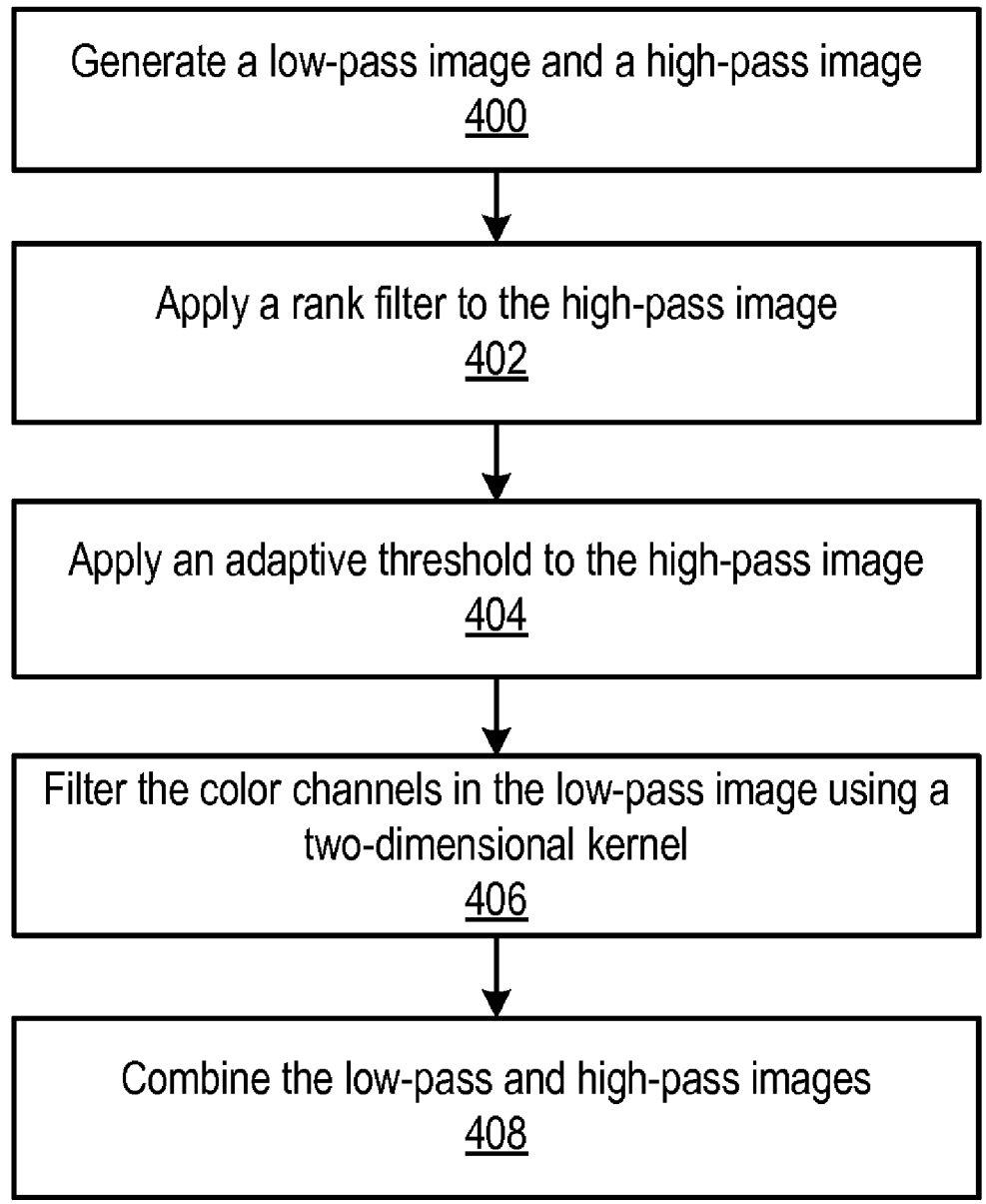
FIG. 4 is a flowchart of a fast color channel filtering method that may be used in at least some embodiments.

FIG. 4 illustrates a color channel filtering method that may be used in at least some embodiments. This method is similar to the previous, higher-quality color channel filtering method, but uses a two-level image pyramid representation of the YCC image, with one full-resolution, high-pass image and one smaller (e.g., ¼ resolution), down-sampled low-pass image. A two-dimensional kernel as described above for the higher-quality method (see equation (6)) may be applied only to the low-pass image; a different and faster technique, described below, is applied to the high-pass image. This results in faster overall processing; however, some fine color details may be lost. This method may be acceptable for applications where highest quality is not required and/or for which higher rendering speed is required, for example in interactive or preview rendering.

As indicated at 400 of FIG. 4, a 2-level image pyramid (e.g., a Laplacian pyramid) may be generated from the YCC image. An image pyramid may be defined as a base, full-resolution image and a series of one or more successively lower-resolution sub-images, for example each successive sub-image at half the resolution of the previous image. This results in a low-pass image L (a smaller sub-image) and a high-pass image H (a full-sized image). L may, for example, be approximately one-quarter of the resolution of the original image, while H is the same size as the original image.

As indicated at 402, an M×M rank filter (e.g., a 3×3 rank filter) may be applied to each color channel in the high-pass image H to reduce color speckles. The rank filter is a generalization of a median filter, as follows. Consider a pixel value x and its immediate neighbors in a 3×3 neighborhood with x as the center pixel. The pixel values in the neighborhood are sorted in ascending order from $x_0, x_1, \ldots, x_8$. (x could lie anywhere on this range). Let r be a rank parameter in the range [0, 4]. The result of the rank filter is that the pixel x is clipped to the range $[x_r, x_{8-r}]$. For example, if r is set to 4, then this is equivalent to a median filter (the center pixel value $x_4$ is used). If r is set to 1, then the pixel value x is clipped to the range $[x_1, x_7]$, thus excluding the smallest and largest pixel values. If the pixel value x is itself clipped from the range, then the pixel value is clipped to the next largest or next smallest pixel value in the range. In at least some embodiments, the value of r may be selected in accordance to the noise level of the image ($k_N$, see equation (3)): smaller values (0 or 1) may be selected for images with less noise, and higher values (3 or 4) may be selected for images with more noise.

As indicated at 404, an adaptive threshold may be applied to each color channel in the high-pass image H. H is a high pass image (image difference values), represents color edge information in the image, and will be added back to the low-pass image L. Small high-pass values represent noise (to be removed), and large high-pass values represent important image features, such as edges (to be preserved). Both can be accomplished using an exponential function applied to each pixel value x; in at least some embodiments, the exponential function may be:

$$x' = x \cdot (1 - e^{(-(x/k_T)^2)}) \qquad (8)$$

where x is the original pixel value, and $x_0$ is the resulting thresholded pixel value. The term in parentheses is a weighting function that tends to be larger as x is larger (a brighter pixel), and smaller as x is smaller (less bright pixel). This tends to preserve brighter pixels and suppress less bright pixels. Brighter pixels tend to represent an image feature such as an edge, and thus should be preserved. Less bright pixels may be symptomatic of noise, and thus should be suppressed. In at least some embodiments, the threshold value $k_T$ may be a positive multiple of the flat noise value $k_N$ (see equation (3)).

As indicated at 406, the higher-quality color noise reduction method (see above) may be applied to the low-pass image L. In other words, the color channels in the low-pass image may be filtered using a two-dimensional kernel as described for the higher-quality color noise reduction method (see equations (6) and (7)). However, this requires less overall processing time than the higher-quality color noise reduction method, since the resolution of image L is, for example, only one-quarter the resolution of the original image.

As indicated at 408, the 2-level image pyramid may be collapsed (i.e., the low-pass and high-pass images may be combined) to obtain noise-reduced image values for the $C_1$ and $C_2$ color channels.

Note that elements 402 and 404-406 of FIG. 4 may be performed in other orders. For example, 404 and 406 may be performed before 402, or in some implementations 402 and 404-406 may be performed concurrently, given appropriate hardware for parallel computation.

Reducing Luminance Noise

The following describes methods for removing or reducing luminance noise (manifested as speckles, blotches, etc.) from the Y channel of the YCC image, while preserving fine details. Because of the sensitivity of the human eye to higher spatial frequencies in the luminance signal (compared to color signals), in these methods, additional care is taken to separate important image features (details, edges, etc.) from less important image areas (e.g., flat and smooth surfaces). This may be done by identifying detail pixels in the luminance channel and applying a one-dimensional filter to the detail pixels; a similar filter, but two-dimensional instead of one-dimensional, is applied to the non-detail pixels. The detail pixels tend to represent edges; the one-dimensional filter is applied at each detail pixel in the direction perpendicular to the local image gradient at the pixel. Thus, the filtering for detail pixels is done along edges, not across edges, which helps to preserve edges and to reduce blurring across edges.

Two luminance noise reduction methods are presented that may be used in embodiments. The first method, which may be referred to as higher-quality luminance noise reduction method, produces higher-quality results but is more expensive to compute. The second method, which may be referred to as fast luminance noise reduction method, is much faster to compute, but may not produce quite as high quality results. In at least some embodiments, the first method may be used for final frame, higher-quality rendering, while the second method may be used for interactive or preview rendering where higher-speed performance is needed. In at least some embodiments, higher-quality noise reduction and faster noise reduction may be provided as options to the user via a user interface to a noise reduction module.

While these luminance channel filtering methods are described in relation to removing noise from the luminance (Y) channel of a YCC image converted from an RGB image, these methods may also be applied to the single channel in one-channel (grayscale) images to remove or reduce noise in the images.

Higher-Quality Luminance Noise Reduction Method

Figure 5:
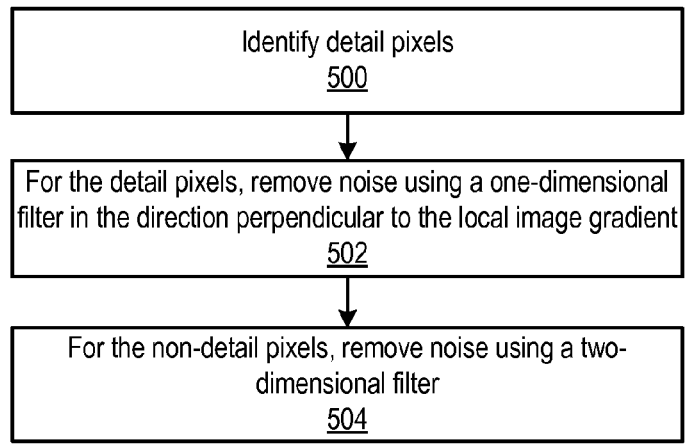
FIG. 5 is a flowchart of a higher-quality luminance channel filtering method that may be used in at least some embodiments.

FIG. 5 illustrates a luminance channel filtering method that may be used in at least some embodiments. As indicated at 500, detail pixels in the luminance channel (Y) of the YCC image may be identified. A detail pixel may be defined as a pixel that is likely to belong to an important image feature, such as an edge or texture. In at least some embodiments, this may be accomplished by comparing a pixel luminance channel value x against the luminance channel value in each neighboring pixel in a local window (e.g., a 3×3 or 5×5 window). If the pixel value x differs from its neighbors by at least a threshold value $k_D$, then the pixel is classified as a detail pixel. If the pixel value x is similar to its neighbors according to the threshold, then the pixel is a non-detail pixel. In some embodiments, the threshold $k_D$ may be a positive multiple of the flat noise value $k_N$ (see equation (3)). In some embodiments, the threshold $k_D$ may be adjustable, e.g. via a user interface control. Other methods may be used to determine detail pixels.

As indicated at 502, for the pixels that were classified as detail pixels, noise may be removed in the luminance channel using a one-dimensional filter, in the direction perpendicular to the local image gradient. This removes noise from details areas such as edges, without blurring the edges themselves. A one-dimensional filter that may be used in some embodiments is:

$$y_0' = \int_{y \in \Omega_{1D}} y_0 \cdot \exp\{-((y - y_0)/k_S)^2\} \qquad (9)$$

where $y_o$ is the current pixel being processed, $\Omega_{1D}$ denotes a one-dimensional window, and $k_S$ denotes a threshold value. Note that this filter weights only according to luminance channel values, and does not consider values in the color channels.

As indicated at 504, for the non-detail pixels, noise may be removed in the luminance channel using a two-dimensional filter. This performs smoothing to a greater extent than the 1-D filter by averaging over more pixels. A suitable two-dimensional filter that may be used in some embodiments is:

$$y_0' = \int_{y \in \Omega_{2D}} y_0 \cdot \exp\{-((y - y_0)/k_S)^2\} \qquad (10)$$

where $y_0$ is the current pixel being processed, $\omega2_{2D}$ denotes a two-dimensional window, and $k_S$ denotes a threshold value. Note that this filter weights only according to luminance channel values, and does not consider values in the color channels.

In some embodiments, in both the detail and non-detail pixel cases, the threshold $k_S$ may be a positive multiple of the flat noise value $k_N$ (see equation (3)). In at least some embodiments, higher values may be used for $k_S$ to perform additional smoothing. In at least some embodiments, the threshold $k_S$ may be adjustable, e.g. via a user interface control.

Note that elements 502 and 504 of FIG. 5 may be performed in other orders. For example, 504 may be performed before 502, or in some implementations 502 and 504 may be performed concurrently, given appropriate hardware for parallel computation.

Fast Luminance Noise Reduction Method

The higher-quality luminance channel filtering method described above may be relatively slow when larger kernels are used (larger kernels may be necessary when processing very noisy images). The filtering step for non-detail pixels may be relatively slow due to the facts that the majority of the pixels in most images are non-detail pixels and that the kernel applied to the non-detail pixels is two-dimensional.

Figure 6:
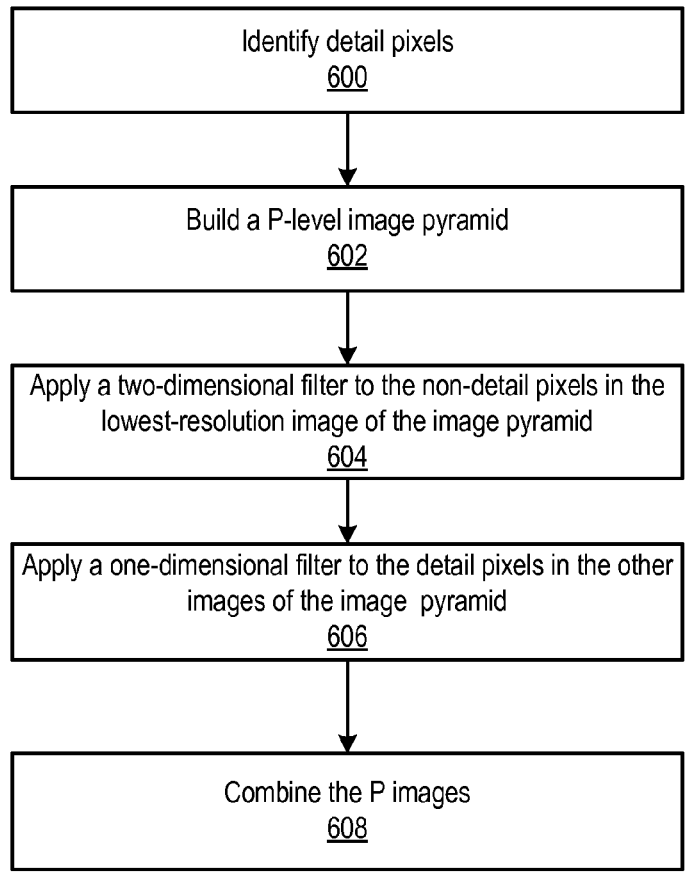
FIG. 6 is a flowchart of a fast luminance channel filtering method that may be used in at least some embodiments.

A variation on the luminance noise reduction method describe above that may be used in at least some embodiments is to perform similar steps using a P-level image pyramid. In some embodiments, for example, a 4-level image pyramid may be used, with one image at full resolution (a high-pass image), and each successive down-sampled image at ½ the width and ½ the height of the next larger image. The smallest image is a low-pass image. FIG. 6 is a flowchart of this method, according to some embodiments. Detail pixels may be identified, for example as described above at 500 of FIG. 5. Referring to FIG. 6, as indicated at 600, a P-level image pyramid (e.g., a 4-level image pyramid) may be built (e.g., a Laplacian pyramid) from the YCC image. This results in a low-pass image L (the lowest-resolution image in the pyramid), and one or more band-pass/high-pass images, $H_1$ to $H_{P-1}$. The value of P may be selected in accordance with the noise level of the image and the available memory for computation. As indicated at 604, the two-dimensional filtering of non-detail pixels is performed only on the low-pass image L (i.e., the lowest-resolution image). As indicated at 606, the one-dimensional filtering of detail pixels as previously described may be performed on the images at all pyramid levels except the low-pass image L. The one-dimensional filter is applied in a direction perpendicular to a local image gradient at each detail pixel, as previously described. Alternatively, the one-dimensional filtering of detail pixels may be performed at all pyramid levels. Thus, image details at multiple spatial scales may be preserved. The kernel sizes (for $\omega_{1D}$ and $\Omega_{2D}$) can be limited to smaller values (e.g., 3×3, 5×5, and 7×7) for faster processing; a small kernel at a lower level of the pyramid corresponds to a large area in the full-resolution image. As indicated at 608, the images in the pyramid may then be combined to obtain the image values for the luminance channel.

Note that elements 604 and 606 of FIG. 6 may be performed in other orders. For example, 606 may be performed before 604, or in some implementations 604 and 606 may be performed concurrently, given appropriate hardware for parallel computation.

YCC to RGB Conversion

The noise-reduced YCC image values may be transformed back to RGB image values using the inverse of the matrix M given in equation (4):

$$\begin{pmatrix} R \\ G \\ B \end{pmatrix} = M^{-1} \cdot \begin{pmatrix} Y \\ C_1 \\ C_2 \end{pmatrix} \quad (11)$$

For example, if $k_r=0.25$, $k_b=0.25$, and $k_g=0:5$, then the inverse matrix $M^{-1}$ is:

$$M^{-1} = \begin{pmatrix} 1 & \frac{3}{2} & 0 \\ 1 & -\frac{3}{4} & -\frac{3}{4} \\ 1 & 0 & \frac{3}{2} \end{pmatrix}$$

Flat Noise Space to Linear Space

The image may be transformed from flat noise space back to linear space, using the inverse of the curve f(x) given in equation (2):

$$f^{-1}(x) = \frac{\left(x\left(\sqrt{A+B} - \sqrt{B}\right) + \sqrt{B}\right)^2 - B}{A} \quad (12)$$

This generates an output image with noise reduced or removed when compared to the original input image.

Example Workflows

The following describes example workflows for image noise reduction that may be used in some implementations, and is not intended to be limiting. In an example workflow, an original color image (e.g., an RGB image) in which noise is to be reduced may be displayed to a user interface of a noise reduction module that implements the noise reduction techniques illustrated in FIGS. 1 through 6. One or more user interface elements for controlling the noise reduction techniques may also be displayed on the user interface. Via the user interface, a user may specify and/or adjust one or more parameters for noise reduction as desired. The fast color noise reduction method and the fast luminance noise reduction method may be applied to the image, and the resulting noise-reduced image may be displayed (e.g., the displayed image may show the results of noise reduction). If the user is not satisfied with the results, the user may adjust the parameters to obtain different results. Once the user is satisfied with the results, the higher-quality color noise reduction method and the higher-quality luminance noise reduction method may be applied according to the current settings to generate a final, higher-quality noise-reduced image, which is then displayed. Thus, this example workflow allows the user to interactively preview the noise reduction and adjust the noise reduction if desired before generating the final, higher-quality output image.

In the above, the input linear space RGB image is converted to a flat noise space image, and the flat noise space image is converted to YCC image space, prior to application of the noise reduction methods. Generally, these images are not displayed to the user, although it is possible to do so. After the noise reduction methods are applied, the YCC image is converted back to RGB space, and the flat noise space image is converted back to a linear space RGB image (with noise reduced), which is displayed. In some embodiments of an iterative workflow as described above where the noise reduction methods may be applied multiple times to interactively preview an image before generating a final, higher-quality result, the pre-processing conversions from linear space to flat noise space and from flat noise space to YCC space may only be performed once, with the results (the YCC image) stored or saved so that this pre-processing does not need to be repeated at each iteration. However, this pre-processing could be performed at each iteration.

For one-channel (grayscale) images, a similar workflow as that described above may be used; however only the luminance noise reduction methods are applied. Also, the RGB-to-YCC and YCC-to-RGB conversions are not used. In some implementations, the higher-quality luminance noise reduction method may perform sufficiently fast on one-channel images so that the fast luminance noise reduction method may not be necessary; however, both the fast luminance noise reduction method and the higher-quality luminance noise reduction method can be applied to one-channel images.

Example Implementations

FIG. 7 illustrates an example noise reduction module that may implement one or more of the noise reduction techniques illustrated in FIGS. 1 through 6. Module 700 may, for example, implement one or more methods for reducing or removing noise from one-channel and/or N-channel (e.g., RGB) images. For example module 700 may implement the fast color noise reduction method, the fast luminance noise reduction method, the higher-quality color noise reduction method, and the higher-quality luminance noise reduction method. Alternatively, a module 700 may implement only the fast color noise reduction method and the fast luminance noise reduction method, or only the higher-quality color noise reduction method and the higher-quality luminance noise reduction method. Other combinations of the noise reduction methods may also be implemented in a module 700; for example, a module 700 may be implemented that only reduces noise in one-channel images, and therefore only implements the luminance noise reduction method(s). FIG. 8 illustrates an example computer system on which embodiments of module 700 may be implemented. FIG. 9 illustrates an example camera in which embodiments of module 700 may be implemented. Module 700 receives as input a digital image 710, for example a one-channel (grayscale) image or a three-channel (RGB) image. The image 710 may be, but is not necessarily, in raw image format. Module 700 may receive user input 712, via user interface 702, for example specifying values for one or more parameters of an image noise reduction method as described herein or selecting from among two or more image noise reduction methods to be used on the input image 710. Module 700 then applies an appropriate image noise reduction method, according to user input 712 if any. Module 700 generates as output an output image 720 with noise removed or reduced in the image. Output image 720 may, for example, be stored to a storage medium 730, such as system memory, a disk drive, DVD, CD, etc. Output image 720 may, in addition or instead, be displayed to a display device 740, or output to some other output device such as a printer. Output image 720 may, in addition or instead, be provided to one or more other image processing modules 750 for further processing.

In some embodiments, noise reduction module 700 may provide a user interface 702 via which a user may interact with the module 700, for example to specifying values for one or more parameters of an image noise reduction method as described herein, or for selecting a desired image noise reduction method to be applied to the image. In some embodiments, the user interface may provide one or more user interface elements or controls, such as slider bars, alphanumeric text entry boxes, menus, etc., whereby the user may specify values for one or more noise reduction parameters and/or select from among two or more image noise reduction methods. In some embodiments, one control may affect the values of two or more parameters; for example, a "degree of noise reduction" slider bar that allows the user to select low, high, or in-between levels of noise reduction may be used to specify the values of two or more noise reduction parameters.

Example Computer System

Embodiments of a noise reduction module and/or of the various image noise reduction methods as described herein may be executed on one or more computer systems, which may interact with various other devices. One such computer system is illustrated by FIG. 8. In different embodiments, computer system 1000 may be any of various types of devices, including, but not limited to, a personal computer system, desktop computer, laptop, notebook, or netbook computer, mainframe computer system, handheld computer, workstation, network computer, a camera, a set top box, a mobile device, a consumer device, video game console, handheld video game device, application server, storage device, a peripheral device such as a switch, modem, router, or in general any type of computing or electronic device.

In the illustrated embodiment, computer system 1000 includes one or more processors 1010 coupled to a system memory 1020 via an input/output (I/O) interface 1030. Computer system 1000 further includes a network interface 1040 coupled to I/O interface 1030, and one or more input/output devices 1050, such as cursor control device 1060, keyboard 1070, and display(s) 1080. In some embodiments, it is contemplated that embodiments may be implemented using a single instance of computer system 1000, while in other embodiments multiple such systems, or multiple nodes making up computer system 1000, may be configured to host different portions or instances of embodiments. For example, in one embodiment some elements may be implemented via one or more nodes of computer system 1000 that are distinct from those nodes implementing other elements.

In various embodiments, computer system 1000 may be a uniprocessor system including one processor 1010, or a multiprocessor system including several processors 1010 (e.g., two, four, eight, or another suitable number). Processors 1010 may be any suitable processor capable of executing instructions. For example, in various embodiments, processors 1010 may be general-purpose or embedded processors implementing any of a variety of instruction set architectures (ISAs), such as the x86, PowerPC, SPARC, or MIPS ISAs, or any other suitable ISA. In multiprocessor systems, each of processors 1010 may commonly, but not necessarily, implement the same ISA.

In some embodiments, at least one processor 1010 may be a graphics processing unit. A graphics processing unit or GPU may be considered a dedicated graphics-rendering device for a personal computer, workstation, game console or other computing or electronic device. Modern GPUs may be very efficient at manipulating and displaying computer graphics, and their highly parallel structure may make them more effective than typical CPUs for a range of complex graphical algorithms. For example, a graphics processor may implement a number of graphics primitive operations in a way that makes executing them much faster than drawing directly to the screen with a host central processing unit (CPU). In various embodiments, the image processing methods disclosed herein may, at least in part, be implemented by program instructions configured for execution on one of, or parallel execution on two or more of, such GPUs. The GPU(s) may implement one or more application programmer interfaces (APIs) that permit programmers to invoke the functionality of the GPU(s). Suitable GPUs may be commercially available from vendors such as NVIDIA Corporation, ATI Technologies (AMD), and others.

System memory 1020 may be configured to store program instructions and/or data accessible by processor 1010. In various embodiments, system memory 1020 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing desired functions, such as those described above for embodiments of a noise reduction module are shown stored within system memory 1020 as program instructions 1025 and data storage 1035, respectively. In other embodiments, program instructions and/or data may be received, sent or stored upon different types of computer-accessible media or on similar media separate from system memory 1020 or computer system 1000. Generally speaking, a computer-accessible medium may include storage media or memory media such as magnetic or optical media, e.g., disk or CD/DVD-ROM coupled to computer system 1000 via I/O interface 1030. Program instructions and data stored via a computer-accessible medium may be transmitted by transmission media or signals such as electrical, electromagnetic, or digital signals, which may be conveyed via a communication medium such as a network and/or a wireless link, such as may be implemented via network interface 1040.

In one embodiment, I/O interface 1030 may be configured to coordinate I/O traffic between processor 1010, system memory 1020, and any peripheral devices in the device, including network interface 1040 or other peripheral interfaces, such as input/output devices 1050. In some embodiments, I/O interface 1030 may perform any necessary protocol, timing or other data transformations to convert data signals from one component (e.g., system memory 1020) into a format suitable for use by another component (e.g., processor 1010). In some embodiments, I/O interface 1030 may include support for devices attached through various types of peripheral buses, such as a variant of the Peripheral Component Interconnect (PCI) bus standard or the Universal Serial Bus (USB) standard, for example. In some embodiments, the function of I/O interface 1030 may be split into two or more separate components, such as a north bridge and a south bridge, for example. In addition, in some embodiments some or all of the functionality of I/O interface 1030, such as an interface to system memory 1020, may be incorporated directly into processor 1010.

Network interface 1040 may be configured to allow data to be exchanged between computer system 1000 and other devices attached to a network, such as other computer systems, or between nodes of computer system 1000. In various embodiments, network interface 1040 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

Input/output devices 1050 may, in some embodiments, include one or more display terminals, keyboards, keypads, touchpads, scanning devices, voice or optical recognition devices, or any other devices suitable for entering or retrieving data by one or more computer system 1000. Multiple input/output devices 1050 may be present in computer system 1000 or may be distributed on various nodes of computer system 1000. In some embodiments, similar input/output devices may be separate from computer system 1000 and may interact with one or more nodes of computer system 1000 through a wired or wireless connection, such as over network interface 1040.

As shown in FIG. 8, memory 1020 may include program instructions 1025, configured to implement embodiments of a noise reduction module as described herein, and data storage 1035, comprising various data accessible by program instructions 1025. In one embodiment, program instructions 1025 may include software elements of embodiments of a noise reduction module as illustrated in the above Figures. Data storage 1035 may include data that may be used in embodiments. In other embodiments, other or different software elements and data may be included.

Those skilled in the art will appreciate that computer system 1000 is merely illustrative and is not intended to limit the scope of a noise reduction module as described herein. In particular, the computer system and devices may include any combination of hardware or software that can perform the indicated functions, including a computer, personal computer system, desktop computer, laptop, notebook, or netbook computer, mainframe computer system, handheld computer, workstation, network computer, a camera, a set top box, a mobile device, network device, internet appliance, PDA, wireless phones, pagers, a consumer device, video game console, handheld video game device, application server, storage device, a peripheral device such as a switch, modem, router, or in general any type of computing or electronic device. Computer system 1000 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via intercomputer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computer system 1000 may be transmitted to computer system 1000 via transmission media or signals such as electrical, electromagnetic, or digital signals, conveyed via a communication medium such as a network and/or a wireless link. Various embodiments may further include receiving, sending or storing instructions and/or data implemented in accordance with the foregoing description upon a computer-accessible medium. Accordingly, the present invention may be practiced with other computer system configurations.

Example Camera System

Embodiments of a noise reduction module and/or of the various image noise reduction methods as described herein may be implemented in various digital cameras. One such camera is illustrated by FIG. 9. In some embodiments of a camera 1100, the camera may include at least a main lens 1102 and a photosensor 1106 (e.g., a CCD or CMOS device). While main lens 1102 is shown as internal to the camera 1100, in some cameras, such as DSLR cameras, main lens 1102 may be external and detachable so that the camera lens 1100 can be changed.

In general, embodiments of a camera 1100 may include, in addition to main lens 1102 and photosensor 1106, any other type of elements and features that may be found in digital cameras. For example, camera 1100 may include a shutter 1104 located in front of or behind main lens 1102, one or more processors 1118, and a power supply or power source 1116, such as one or more replaceable or rechargeable batteries. Camera 1100 may include a memory storage device or system 1120 for storing captured images and/or rendered final images, and/or for storing other information such as software. In some cameras, the memory 1120 may be a removable/swappable storage device such as a memory stick. Camera 1100 may include a screen 1112 (e.g., an LCD screen) for viewing scenes in front of the camera prior to capture and/or for viewing previously captured and/or rendered images. The screen 1112 may also be used to display one or more menus or other information to the user. Camera 1100 may include one or more I/O interfaces 1122, such as FireWire or Universal Serial Bus (USB) interfaces, for transferring information, e.g. captured light-field images, software updates, and so on, to and from external devices such as computer systems or even other cameras. Camera 1100 may include a shutter release 1110 that is activated to capture a light-field image of a subject or scene.

Camera 1100 may include one or more controls 1114, for example controls for controlling optical aspects of the camera 1100 such as shutter speed, controls for viewing and otherwise managing and manipulating captured images stored in a memory 1120 on the camera, etc. Camera 1100 may include controls for adjusting the relative location of (the distance between) the components in the camera 1100, such as the distance between main lens 1102 and photosensor 1106, or for adjusting other camera 1100 features, such as shutter speed.

Camera 1100 may include a noise reduction module 1150 for removing or reducing noise in digital images (either in raw image format or in some other image format) captured by the camera 1100 according to one or more of the image noise reduction methods described herein, and may also include one or more other image processing modules for otherwise processing images captured by the camera 1100. Noise reduction module 1150 may be implemented in hardware, software, or a combination thereof.

CONCLUSION

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, volatile or non-volatile media such as RAM (e.g. SDRAM, DDR, RDRAM, SRAM, etc.), ROM, etc., as well as transmission media or signals such as electrical, electromagnetic, or digital signals, conveyed via a communication medium such as network and/or a wireless link.

The various methods as illustrated in the Figures and described herein represent example embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended that the invention embrace all such modifications and changes and, accordingly, the above description to be regarded in an illustrative rather than a restrictive sense.

What is claimed is:

1. A non-transitory computer-readable storage medium storing program instructions, wherein the program instructions are computer-executable to implement:
    transforming an input linear space image containing noise into flat noise space to produce a flat noise space image in which the noise is independent of signal values;
    applying an edge-preserving noise filtering technique to the flat noise space image to reduce the noise in the flat noise space image, wherein, in said applying an edge-preserving noise filtering technique to the flat noise space image, the program instructions are computer-executable to implement:
        identifying detail pixels and non-detail pixels in the flat noise space image, wherein the detail pixels indicate edges in the flat noise space image; and
        applying filters to the detail pixels and to the non-detail pixels in the flat noise space image, wherein a different filter is applied to the detail pixels than the filter applied to the non-detail pixels so that the edges in the flat noise space image indicated by the detail pixels are preserved; and
    transforming the flat noise space image with reduced noise into linear space to produce an output linear space image with reduced noise.

2. The non-transitory computer-readable storage medium as recited in claim 1, wherein, in said transforming an input linear space image containing noise into flat noise space to produce a flat noise space image, the program instructions are computer-executable to implement applying:

$$f(x) = \frac{\sqrt{A \cdot x + B} - \sqrt{B}}{\sqrt{A + B} - \sqrt{B}}$$

to each channel of the input linear space image, where x is the input image value in linear space, f(x) is the output image value in flat noise space, and A and B are noise parameters, wherein values for A and B are obtained from a table storing predetermined values for A and B or are empirically determined.

3. The non-transitory computer-readable storage medium as recited in claim 1, wherein the input linear space image is a one-channel image, wherein, in said applying filters to the detail pixels and to the non-detail pixels in the flat noise space image, the filter applied to the non-detail pixels is a two-dimensional filter and the different filter applied to the detail pixels is a one-dimensional filter, wherein the one-dimensional filter is applied in a direction perpendicular to a local image gradient at each detail pixel.

4. The non-transitory computer-readable storage medium as recited in claim 1, wherein the input linear space image is a three-channel color image, wherein the program instructions are computer-executable to implement, prior to said applying an edge-preserving noise filtering technique to the flat noise space image, transforming the flat noise space image from three-channel color space with three color channels to a three-channel luminance-chrominance space with one luminance channel and two chrominance channels.

5. The non-transitory computer-readable storage medium as recited in claim 4, wherein the program instructions are computer-executable to implement, prior to said transforming the flat noise space image with reduced noise into linear space, transforming the flat noise space image with reduced noise from the three-channel luminance-chrominance space to the three-channel color space.

6. The non-transitory computer-readable storage medium as recited in claim 4, wherein, in said transforming the flat noise space image from three-channel color space with three color channels to a three-channel luminance-chrominance space with one luminance channel and two chrominance channels, the program instructions are computer-executable to implement applying a 3×3 matrix transformation to pixels in the flat noise space image, wherein the matrix is constructed as:

$$M = \begin{pmatrix} k_r & k_g & k_b \\ (k_r-1)k_{rS} & k_g k_{rS} & k_b k_{rS} \\ k_r k_{bS} & k_g k_{bS} & (k_b-1)k_{bS} \end{pmatrix}$$

where $k_r$, $k_g$, and $k_b$ are non-negative constants each corresponding to one of the three color channels such that $k_r+k_g+k_b=1$, where $k_{rS}=0.51(k_r-1)$, and where $k_{bS}=0.5/(k_b-1)$.

7. The non-transitory computer-readable storage medium as recited in claim 4, wherein the three-channel color space is RGB color space.

8. The non-transitory computer-readable storage medium as recited in claim 4, wherein the three-channel luminance-chrominance space is a YCC color space, where Y is the luminance channel and $C_1$, and $C_2$ are the color channels.

9. The non-transitory computer-readable storage medium as recited in claim 4, wherein, in said applying an edge-preserving noise filtering technique to the flat noise space image, the program instructions are computer-executable to implement:
  applying an edge-preserving color noise reduction technique to each of the two chrominance channels in the flat noise space image; and
  applying an edge-preserving luminance noise reduction technique to the luminance channel in the flat noise space image;
  wherein said identifying detail pixels and non-detail pixels in the flat noise space image and said applying filters to the detail pixels and to the non-detail pixels in the flat noise space image are performed by the edge-preserving luminance noise reduction technique.

10. The non-transitory computer-readable storage medium as recited in claim 9, wherein, in said applying an edge-preserving color noise reduction technique to each of the two chrominance channels, the program instructions are computer-executable to implement, for each pixel in each chrominance channel:
  computing a weighted average of the chrominance channel values for pixels in a two-dimensional neighborhood at the pixel; and
  replacing the chrominance channel value of the pixel with the computed weighted average.

11. The non-transitory computer-readable storage medium as recited in claim 10, wherein, in said computing a weighted average of the chrominance channel values for pixels in a two-dimensional neighborhood at the pixel, the program instructions are computer-executable to implement applying a weighting function that weights according to values from all three channels in the luminance-chrominance space.

12. The non-transitory computer-readable storage medium as recited in claim 9, wherein, in said applying an edge-preserving color noise reduction technique to each of the two chrominance channels, the program instructions are computer-executable to implement:
  generating a two-level image pyramid representation of the flat noise space image, wherein the two-level image pyramid comprises a full resolution high-pass image and a lower resolution low-pass image;
  applying a rank filter to each chrominance channel in the high-pass image, wherein the rank filter reduces color speckles by clipping chrominance channel values at pixels in the chrominance channel according to a specified range for the rank filter;
  applying an adaptive threshold to each chrominance channel in the high-pass image, wherein the adaptive threshold is weighted to preserve brighter pixels and suppress darker pixels;
  for each chrominance channel in the low-pass image, computing a weighted average of the chrominance channel values for pixels in a two-dimensional neighborhood at the pixel and replacing the chrominance channel value of the pixel with the computed weighted average; and
  combining the high-pass image and the low-pass image to produce the flat noise space image with noise reduced in the chrominance channels.

13. The non-transitory computer-readable storage medium as recited in claim 12, wherein, in said computing a weighted average of the chrominance channel values for pixels in a two-dimensional neighborhood at the pixel, the program instructions are computer-executable to implement applying a weighting function that weights according to values from all three channels in the luminance-chrominance space.

14. The non-transitory computer-readable storage medium as recited in claim 9, wherein, in said applying filters to the detail pixels and to the non-detail pixels in the flat noise space image, the filter applied to the non-detail pixels is a two-dimensional filter that is applied to the luminance channel of the non-detail pixels, and the different filter applied to the detail pixels is a one-dimensional filter that is applied to the luminance channel of the detail pixels, wherein the one-dimensional filter is applied in a direction perpendicular to a local image gradient at each detail pixel.

15. The non-transitory computer-readable storage medium as recited in claim 14, wherein the one-dimensional filter and the two-dimensional filter that are applied to the luminance channel each apply a weighting function that weights according to luminance channel values and that does not consider values in the chrominance channels.

16. The non-transitory computer-readable storage medium as recited in claim 9, wherein, in said applying an edge-preserving luminance noise reduction technique to the luminance channel in the flat noise space image, the program instructions are computer-executable to implement:
  generating a P-level image pyramid representation of the flat noise space image, wherein the P-level image pyramid comprises a lowest resolution low-pass image and one or more higher resolution images including one full-resolution high-pass image;
  identifying detail pixels and non-detail pixels in the images in the pyramid, wherein the detail pixels indicate edges in the image;
  applying a two-dimensional filter to the luminance channel of the non-detail pixels in the low-pass image;
  applying a one-dimensional filter to the luminance channel of the detail pixels in each of the one or more higher resolution images, wherein the one-dimensional filter is applied in a direction perpendicular to a local image gradient at each detail pixel; and
  combining the one or more higher resolution images and the low-pass image to produce the flat noise space image with noise reduced in the luminance channel.

17. The non-transitory computer-readable storage medium as recited in claim 16, wherein the one-dimensional filter and the two-dimensional filter each apply a weighting function that weights according to luminance channel values and that does not consider values in the chrominance channels.

18. A method, comprising:
performing, on a computer system:
- transforming an input linear space image containing noise into flat noise space to produce a flat noise space image in which the noise is independent of signal values;
- applying an edge-preserving noise filtering technique to the flat noise space image to reduce the noise in the flat noise space image, wherein, said applying an edge-preserving noise filtering technique to the flat noise space image comprises:
  - identifying detail pixels and non-detail pixels in the flat noise space image, wherein the detail pixels indicate edges in the flat noise space image; and
  - applying filters to the detail pixels and to the non-detail pixels in the flat noise space image, wherein a different filter is applied to the detail pixels than the filter applied to the non-detail pixels so that the edges in the flat noise space image indicated by the detail pixels are preserved; and
- transforming the flat noise space image with reduced noise into linear space to produce an output linear space image with reduced noise.

19. A system, comprising:
at least one processor; and
a memory comprising program instructions, wherein the program instructions are executable by the at least one processor to:
- transform an input linear space image containing noise into flat noise space to produce a flat noise space image in which the noise is independent of signal values;
- apply an edge-preserving noise filtering technique to the flat noise space image to reduce the noise in the flat noise space image, wherein, to apply an edge-preserving noise filtering technique to the flat noise space image, the program instructions are executable by the at least one processor to:
  - identify detail pixels and non-detail pixels in the flat noise space image, wherein the detail pixels indicate edges in the flat noise space image; and
  - apply filters to the detail pixels and to the non-detail pixels in the flat noise space image, wherein a different filter is applied to the detail pixels than the filter applied to the non-detail pixels so that the edges in the flat noise space image indicated by the detail pixels are preserved; and
- transform the flat noise space image with reduced noise into linear space to produce an output linear space image with reduced noise.

20. The system as recited in claim 19, wherein the system is a digital camera.

* * * * *

UNITED STATES PATENT AND TRADEMARK OFFICE
CERTIFICATE OF CORRECTION

Page 1 of 1

PATENT NO.       : 7,983,511 B1
APPLICATION NO.  : 12/955438
DATED            : July 19, 2011
INVENTOR(S)      : Eric Chan It is certified that error appears in the above-identified patent and that said Letters Patent is hereby corrected as shown below:

In the Claims:

Claim 6, col. 21, line 19, please delete "=0.51" and insert --=0.5/-- in place thereof.

Signed and Sealed this

Thirteenth Day of September, 2011

David J. Kappos
*Director of the United States Patent and Trademark Office*